May 24, 1938. W. W. SLOANE 2,118,529
KERF CUTTING MACHINE
Filed June 5, 1936 6 Sheets-Sheet 2
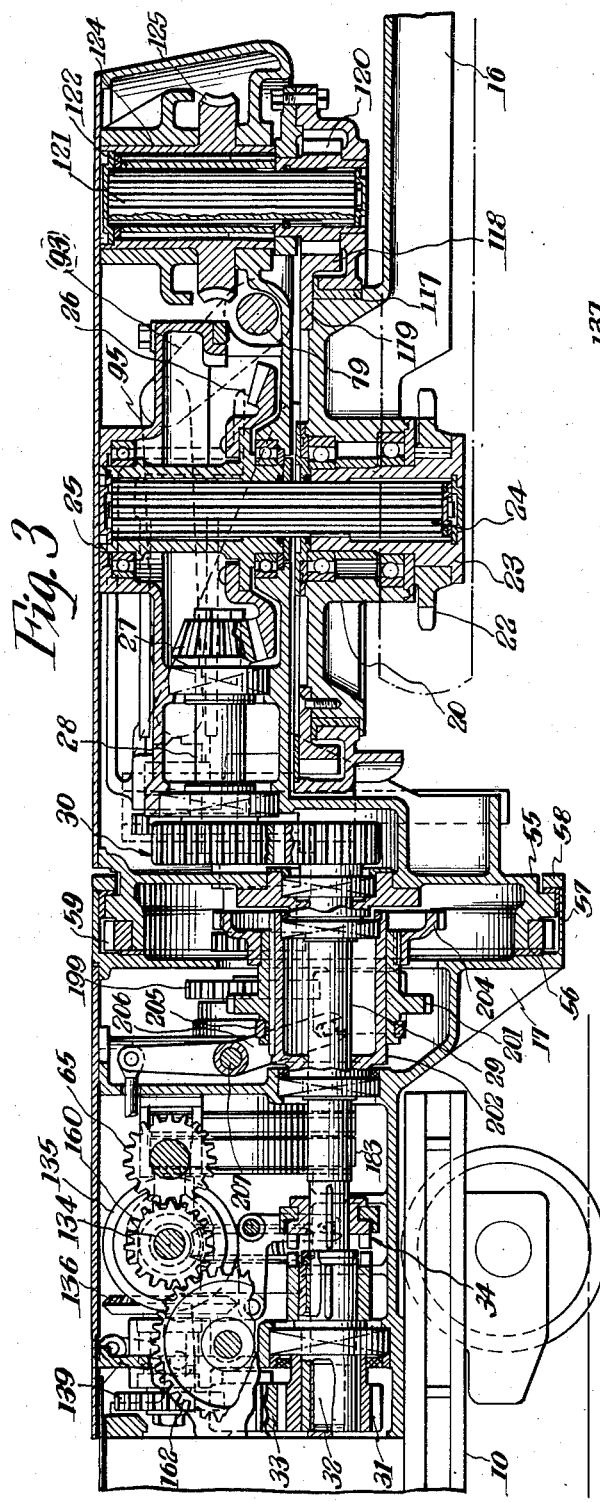
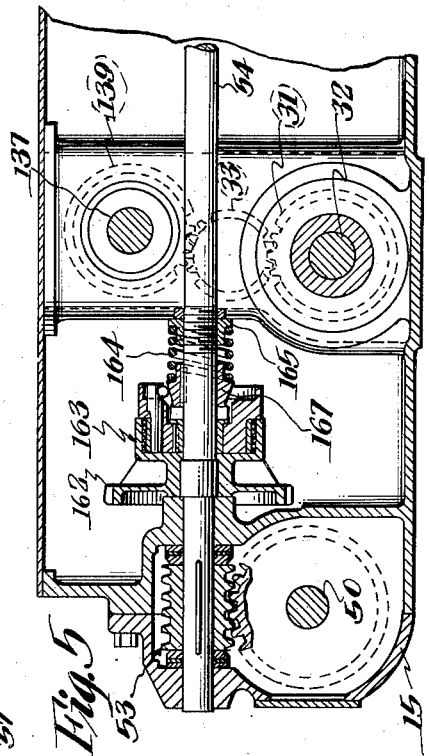
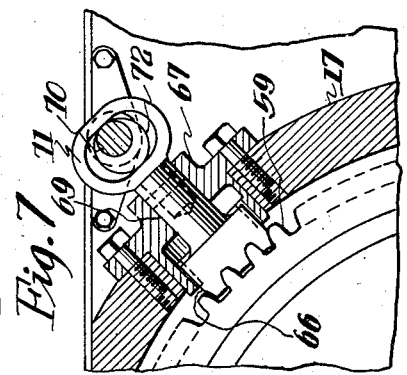
Inventor
William W. Sloane
Clarence F. Poole
Attorney

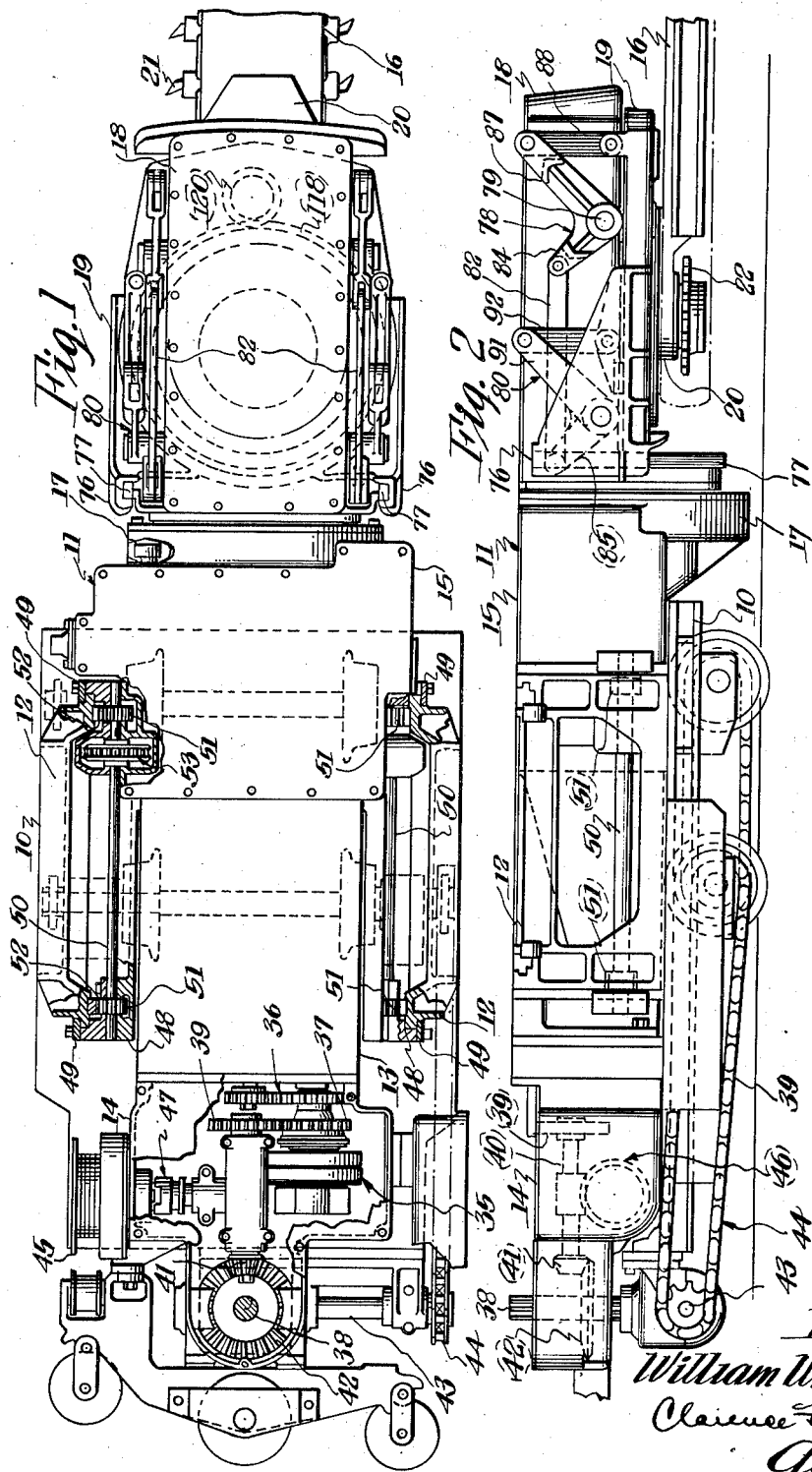

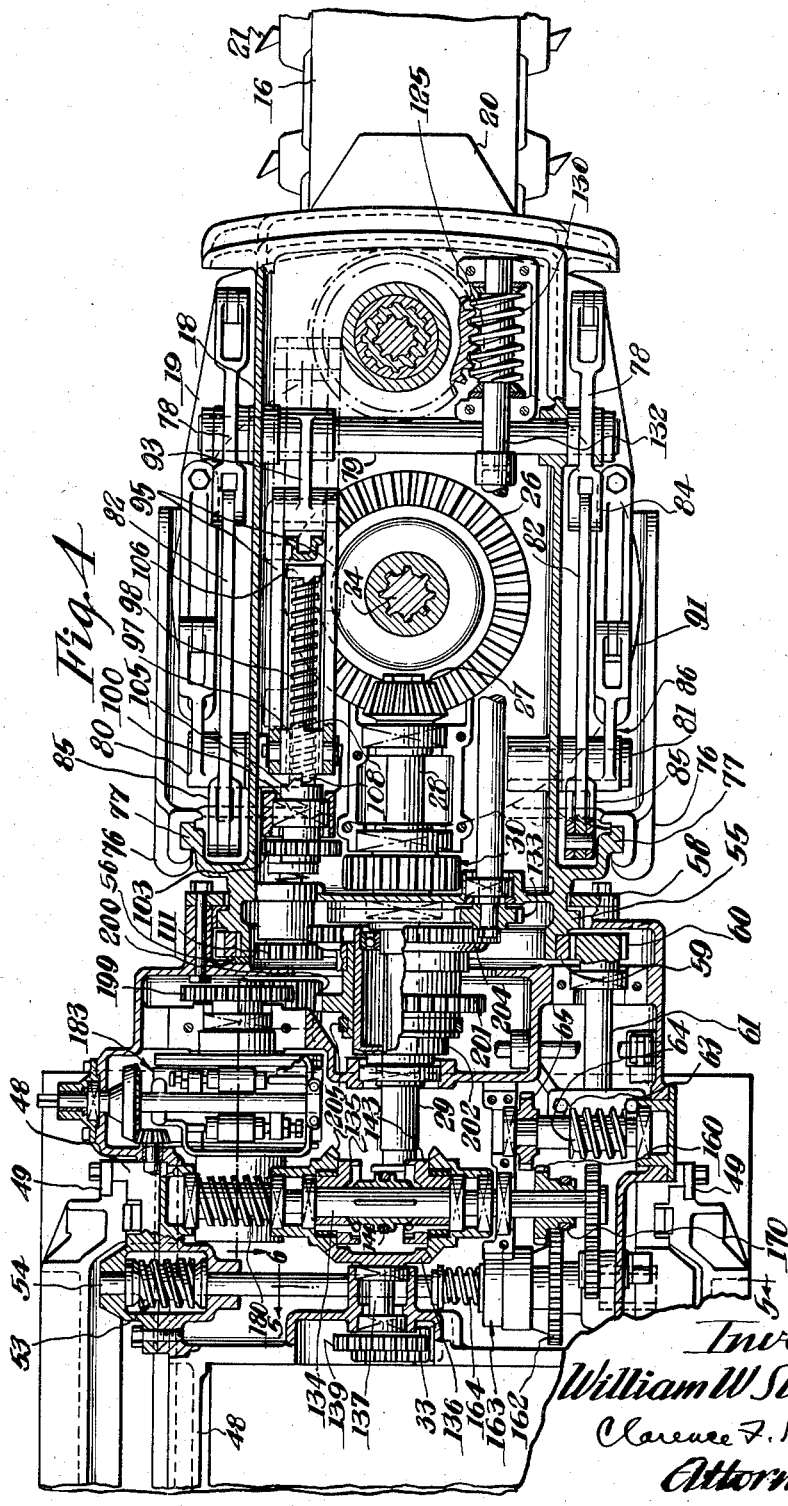

May 24, 1938.　　　W. W. SLOANE　　　2,118,529
KERF CUTTING MACHINE
Filed June 5, 1936　　　6 Sheets-Sheet 4
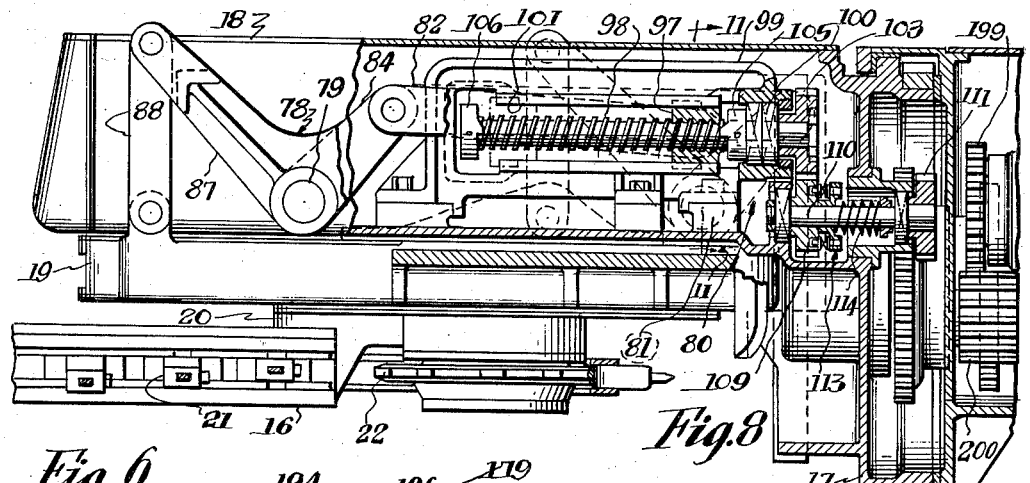
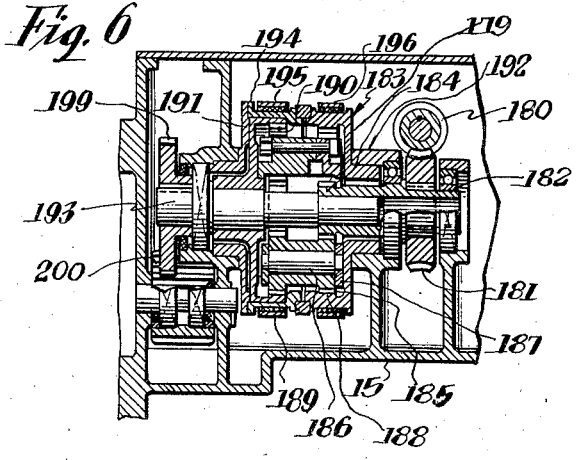
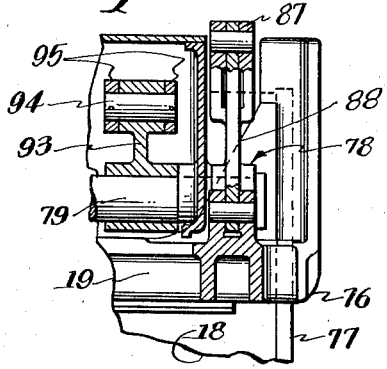
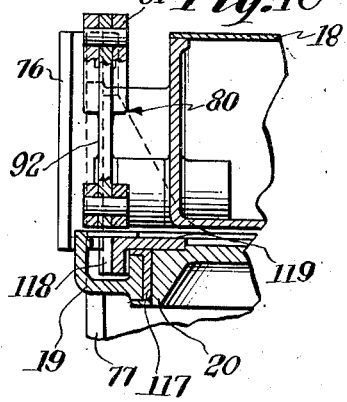
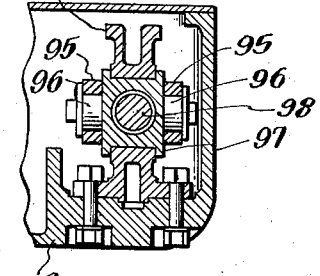
Inventor
William W. Sloane
Clarence F. Poole
Attorney May 24, 1938.  W. W. SLOANE  2,118,529
KERF CUTTING MACHINE
Filed June 5, 1936  6 Sheets-Sheet 5
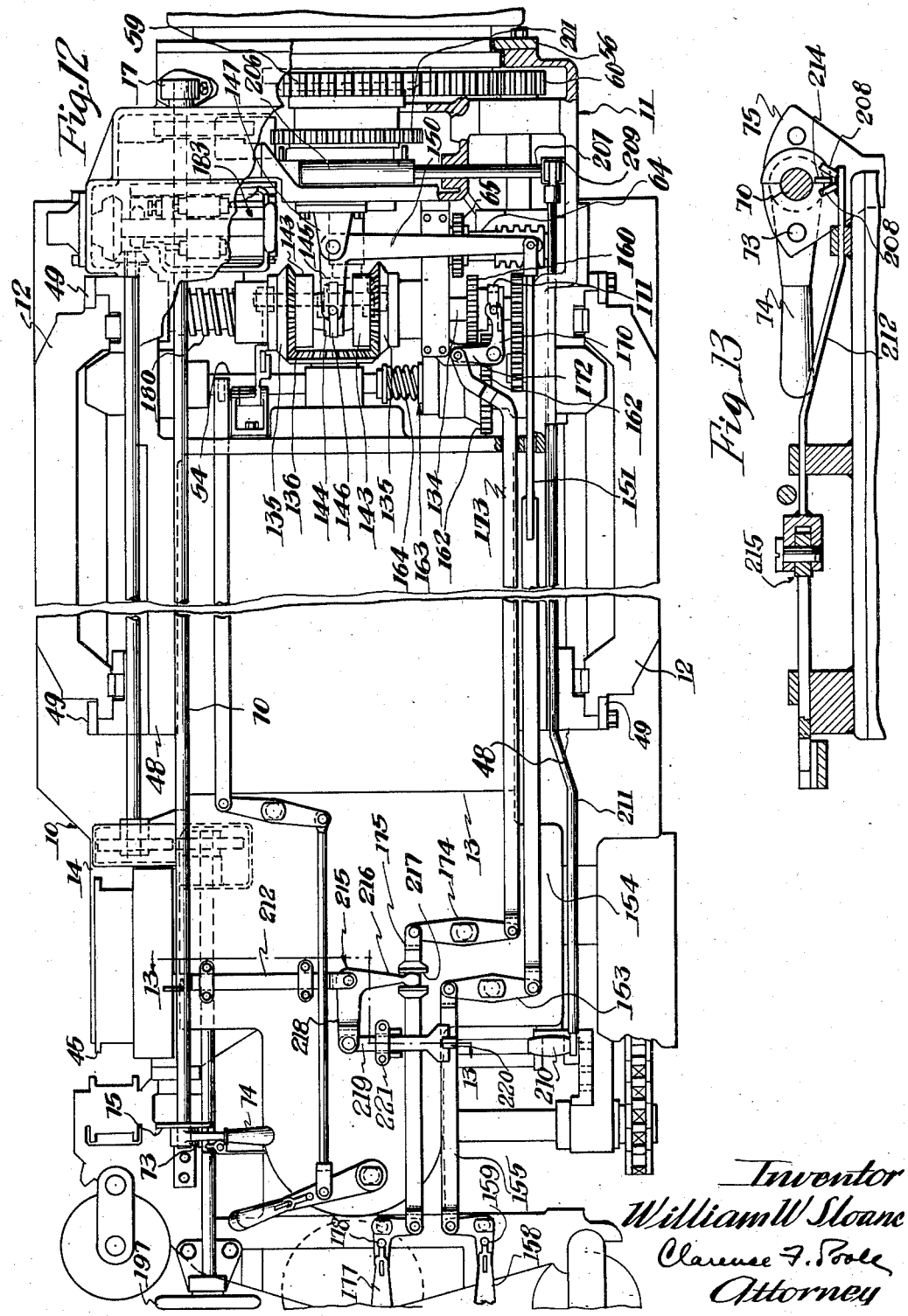
Inventor
William W. Sloane
Clarence F. Poole
Attorney

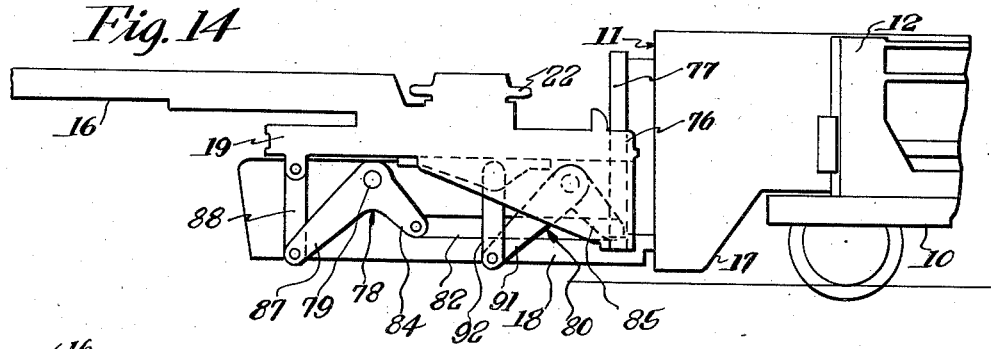
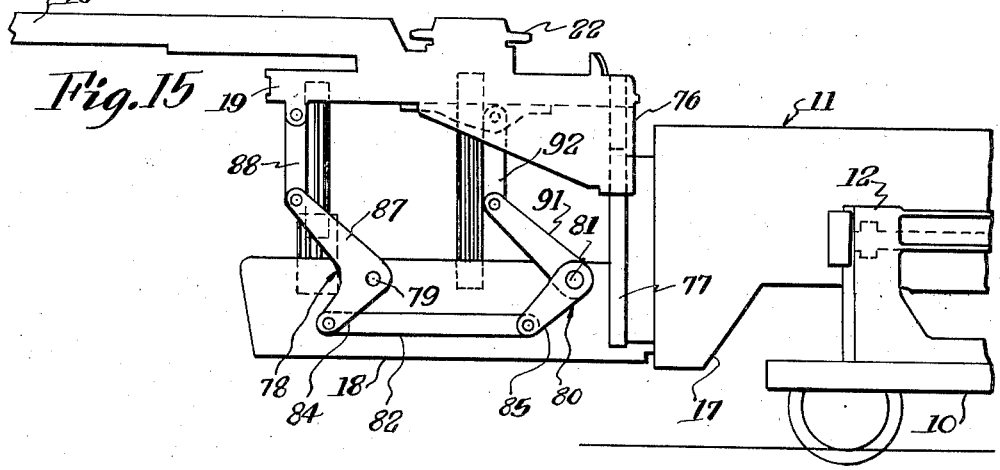
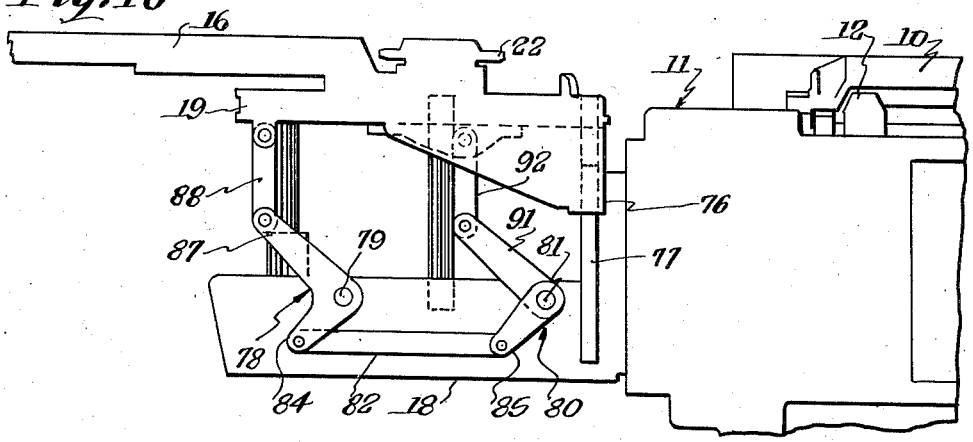

Patented May 24, 1938

2,118,529

UNITED STATES PATENT OFFICE 2,118,529

KERF-CUTTING MACHINE

William W. Sloane, Chicago, Ill., assignor to Goodman Manufacturing Company, Chicago, Ill., a corporation of Illinois Application June 5, 1936, Serial No. 83,733

10 Claims. (Cl. 262—28)

This invention relates to improvements in kerf-cutting machines of the track-mounted type adapted for use in restricted places for cutting horizontal kerfs at various positions from the mine roof to the mine floor, or shearing kerfs at either side of the machine.

Among the objects of my invention are to provide a machine of the class described constructed in a novel manner so as to be of a simple and rugged construction suitable for use in mines wherein the radius of curvature of the track is relatively short.

Another object of my invention is to provide a novel form of locking means for holding the cutter bar in adjusted position for cutting shearing and horizontal kerfs and provide an interlocking connection between this locking means and the means for controlling the positioning of the cutter bar to cut shearing or horizontal kerfs.

Other objects of my invention will appear from time to time as the following specification proceeds.

My invention may be more clearly understood with reference to the accompanying drawings wherein:

Figure 1 is a top plan view of a mining machine constructed in accordance with my invention with certain parts broken away and shown in section;

Figure 2 is a side elevation of the device shown in Figure 1;

Figure 3 is a fagmentary longitudinal sectional view of the forward portion of the machine shown in Figure 1, drawn to an enlarged scale;

Figure 4 is a fragmentary plan view of the forward portion of the machine shown in Figure 1 drawn to an enlarged scale, with the gear covers removed and certain parts broken away and shown in horizontal section in order to more clearly illustrate certain details of my invention;

Figure 5 is an enlarged fragmentary sectional view taken substantially along line 5—5 of Figure 4;

Figure 6 is an enlarged fragmentary sectional view taken substantially along line 6—6 of Figure 4;

Figure 7 is an enlarged detail view with parts shown in vertical section, showing certain details of the mechanism for locking the cutter bar in position to cut in various angular positions with respect to the coal face;

Figure 8 is a detail view of the forward portion of the machine drawn to substantially the same scale as Figure 3, but showing the opposite side of the machine from Figure 3, and showing certain parts broken away and in longitudinal sectional view not shown in Figure 3;

Figure 9 is a detail partial fragmentary vertical sectional view showing certain details of the cutter bar adjusting mechanism;

Figure 10 is a detail partial fragmentary vertical sectional view showing certain other details of the cutter bar adjusting mechanism not shown in Figure 9;

Figure 11 is a detail partial fragmentary sectional view taken substantially along line 11—11 of Figure 8, showing certain details of the cutter bar adjusting mechanism not shown in Figures 9 and 10;

Figure 12 is a detail plan view of the machine drawn to an enlarged scale with parts of the gear covers broken away showing the position of the control levers of the machine;

Figure 13 is a sectional view taken substantially along line 13—13 of Figure 12;

Figures 14 and 15 are diagrammatical views in side elevation, showing the cutter bar positioned for cutting horizontal kerfs at various elevations with respect to the ground; and Figure 16 is a diagrammatical view in plan showing the cutter bar positioned for cutting a shearing kerf.

In the drawings the embodiment of my invention illustrated includes a track mounted truck 10 having a cutting element 11 mounted thereon for vertical adjustment with respect thereto in a pair of parallel-spaced guides 12, 12.

The cutting element 11 includes generally a motor 13 having truck driving mechanism disposed rearwardly thereof and housed in and supported by a support frame 14 extending rearwardly from said motor, and having cutting mechanism disposed forwardly of said motor. Said cutting mechanism includes a projecting cutter bar 16 supported by a support frame 15 secured to and projecting from the forward end of said motor.

The cutting mechanism support frame 15 has a projecting forward end 17, a portion of which end depends from said truck and forms a longitudinal pivotal bearing support for a turning frame 18 which projects forwardly from said forward end. Said turning frame has a support frame 19 mounted for rectilinear movement with respect thereto in a plurality of parallel planes in a manner which will hereinafter more clearly appear as this specification proceeds.

A cutter frame 20, which forms a support member for the cutter bar 16, is pivotally mounted in the support frame 19 for pivotal movement about an axis perpendicular to the longitudinal axis of the machine. Said cutter bar has a cutter chain 21 movable thereabout in a closed orbital path which meshes with a sprocket 22 mounted on a sleeve 23 journaled in said cutter frame coaxial with the pivotal axis thereof in suitable ball bearings (see Figure 3).

The cutter chain 21 is driven from the forward end of the motor 13 through a suitable extensible drive connection which includes a splined shaft 24 slidably engaging an internally splined bore of the sleeve 23, and an internally splined hub 25 of a bevel gear 26. Said bevel gear is driven from a bevel pinion 27 on the forward end of a longitudinally extending shaft 28. Said shaft is driven from a longitudinally extending shaft 29 coaxial with the axis of the turning frame 18, by means of a gear train, generally indicated by reference character 30. The drive from the motor to said last-mentioned shaft includes a spur gear 31 on a shaft 32 aligned with the shaft 29, which meshes with a pinion 33 on the forward end of the shaft for the motor 13. Clutch mechanism, generally indicated by reference character 34, is provided for selectively connecting said shafts together. Said clutch mechanism is not herein described in detail since it is no portion of my present invention.

The mechanism for driving the truck and propelling the mining machine is similar to that shown in Patent No. 1,984,487, which issued to Frank A. Lindgren, December 18, 1934, so will only herein be described insofar as is necessary to make my present invention clearly understandable, and includes a planetary gear reduction device, generally indicated by reference character 35, which is driven from the rearward end of the motor by means of a gear train, generally indicated by reference character 36. Said planetary is not herein shown or described in detail since it is no part of my present invention. A spur gear 37 mounted coaxial with the planetary 35 is adapted to be driven therefrom at either a high or low frictionally controlled speed. Said spur gear drives a vertical splined shaft 38 by means of a spur gear 39, a shaft 40, a bevel pinion 41 and a bevel gear 42. Said splined shaft is mounted for slidable movement with respect to said bevel gear to permit the truck to be driven when the cutting element is in various positions for adjustment with respect thereto and drives a transverse shaft 43 on the truck frame through a suitable gear train of an ordinary construction (not shown). The truck is driven from said last-named shaft by means of a chain and sprocket drive, generally indicated by reference character 44.

A winding drum 45 is provided to aid in propelling the machine up grades, and to aid in feeding the cutter bar into the coal, or along the coal face where the tractive effort of the track wheels is not sufficient. Said winding drum is selectively driven from the shaft 40 by means of a worm and worm gear train 46 and suitable clutch mechanism, generally indicated by reference character 47 (see Figures 1 and 2).

The cutting mechanism support frame 15 secured to the forward end of the motor has parallel-spaced integrally formed rearwardly projecting side members 48, 48, which extend along the sides of the motor 13. Said side members are provided with spaced-apart vertically extending shouldered portions adjacent the forward and rearward ends thereof which engage the ends and inner sides of the guides 12, 12 (see Figure 1). Said frame is held in engagement with said guides by means of retaining strips 49, 49 secured to said side members adjacent the shouldered portions thereof and abutting shouldered outer sides of said guides as is best shown in Figures 1 and 4.

Parallel-spaced shaft 50, 50 are journaled adjacent their ends in the side members 48, 48 of the cutting mechanism support frame 15. Each of said shafts has a pair of spaced pinions 51, 51 mounted thereon adjacent opposite ends thereof which mesh with vertically disposed racks 52, 52 mounted on the inner faces of the guides 12, 12. The shafts 50, 50 are each simultaneously driven from a shaft 54 mounted in the frame 15 and disposed transversely thereof, by means of separate worm and worm gear drives, indicated by reference characters 53, 53 (see Figures 1, 4, and 5). Said last-named shaft is selectively driven from the forward end of the motor 13 in a manner which will hereinafter be more fully described as this specification proceeds.

The turning frame 18 is mounted on the frame 15 for movement about a longitudinally extending axis by means of a rearwardly disposed annularly shouldered portion 55 formed integral with said turning frame. Said annular shouldered portion is journaled within a cylindrical inner periphery of the forward end 17 of the cutting mechanism support frame 15. The rear end of said annular shouldered portion abuts an annular bearing member 56 and a forward shouldered portion thereof is journaled in a shouldered bearing member 57. An annular ring 58 is secured to the forward end of the portion 17 and abuts the shouldered bearing 57 for retaining said bearing and the frame 15 in position.

A spur ring gear 59 is mounted on the rear end of the annular shouldered portion 55 and abuts the annular bearing 56. Said ring gear is driven from a spur pinion 60 (see Figure 4) for turning said turning frame, which pinion is on the forward end of a longitudinally extending shaft 61. Said shaft is journaled in the cutting mechanism support frame 15 in a suitable manner and is driven from a transversely extending shaft 63 by means of a suitable worm and worm gear drive, generally indicated by reference character 64. Said worm and worm gear are of the self-locking type arranged to hold the turning frame 18 in the desired position until positively locked. A spur gear 65 is keyed on the inner end of the shaft 63 and is adapted to be selectively driven from the motor 13 by means of a novel arrangement of gearing which will hereinafter be more fully described as this specification proceeds.

The turning frame 18 is positively locked in fixed relation with respect to the cutting mechanism support frame 15 during the cutting operation by means of a toothed segment 66 adapted to engage the teeth of the spur gear 59 (see Figure 7). Said segment is slidably guided in a member 67 secured to the enlarged forward end 17 and fitting in a rectangular slot formed in said enlarged forward end, and, as herein shown, said segment is on the left hand side of the end portion 17 when looking toward the forward end of the machine. A shank 69 extends outwardly from said toothed segment and is slidably guided in an aperture formed in the member 67 and has an elongated eye 71 mounted in and extending from the outer end of said shank. Said eye is adapted to be engaged by an eccentric 72 on a longitudinally extending rock shaft 70 for moving said toothed segment into and out of engagement with the teeth of the spur gear 59 (see Figure 7) upon rocking movement of said shaft in an obvious manner.

The shaft 70 extends rearwardly along the top of the machine to a point disposed adjacent the rearward end thereof and has an operating handle 74 mounted on its rear end. Said shaft and operating handle are locked from movement by means of a locking pin 73, mounted in said handle in a usual manner, which is adapted to register for engagement with suitable apertures formed in a locking plate 75 (see Figures 12 and 13).

Referring now particularly to the mechanism for moving the support frame 19 toward or from the turning frame 18 in parallel relation with respect thereto and equalizing the loads between said frames, said support frame is provided with a pair of parallel-spaced guides 76, 76 extending from the rearward end thereof which register for engagement with parallel-spaced guides 77, 77 extending from the turning frame 18 immediately forwardly of the annular shouldered portion 55. Said adjusting mechanism includes a novel arrangement of parallel link mechanism disposed forwardly of the guides 77, 77 and having engagement with opposite sides of the forward and rearward ends of said support frame which includes a pair of bell crank members 78, 78 pivotally mounted on opposite sides of the forward end of the turning frame 18 on a transversely extending shaft 79, and a pair of bell crank members 80, 80 mounted adjacent the rearward end of said turning frame on the outer sides thereof and forwardly of the guides 77, 77 on aligned oppositely extending transversely disposed stud shafts 81, 81. The bell crank members 78, 78 and 80, 80 are connected together to operate as a unit by means of parallel links 82, 82 pivotally connected to lever arms 84, 84 and 85, 85 of respective of said bell crank members. Thus, all of said bell crank members may rock together as a unit in parallel relation with respect to each other upon rocking movement of the shaft 79.

A second lever arm 87 of each bell crank member 78 is pivotally connected to the forward end of the supporting frame 19 by means of a link 88 extending downwardly therefrom. In a like manner, a second lever arm 91 of each bell crank member 80 is pivotally connected with a rearward portion of the supporting frame 19 by means of a link 92 which depends from said lever arm in parallel relation with respect to the link 88.

The transversely extending shaft 79 is rocked to move the supporting frame 19 in parallel relation with respect to the turning frame 18 by means of a crank arm 93 secured to said shaft and herein shown as extending upwardly and angularly rearwardly therefrom, when the parts are in the position shown in Figures 3, 4, and 8. Said crank arm has a pair of parallel-spaced rearwardly extending links 95, 95 pivotally connected to opposite sides thereof on the ends of a pin 94. The rearward ends of said links are pivotally connected to stud shafts or pivotal pins 96, 96 extending outwardly from opposite sides of a nut 97. Said nut is threaded on a threaded shaft 98 which is journaled at its rearward end in a guide frame 99 on suitable ball bearings 100, 100. Said shaft extends forwardly along a guide 101 formed in said guide frame, between the upper and lower sides of said guide and said nut is guided for movement along said guide (see Figures 4, 8, and 11). Said guide frame is mounted on and extends upwardly from the bottom of the turning frame 18.

Suitable means are provided on the threaded shaft 98 for engaging the nut 97 at the extreme ends of its path of travel along said shaft which as herein shown comprise a stop 105 mounted adjacent the forward end of the front ball bearing 100 and a stop 106 at the forward end of said shaft. Said stops are adapted to engage suitable jaws 108, 108 extending forwardly and rearwardly from the nut 97.

A spur gear 103 is secured to the rearward end of the threaded shaft 98 for driving said shaft. Said spur gear is meshed with a spur gear 109 freely mounted on the forward end of a longitudinally extending shaft 110. Said last-mentioned shaft is driven by a spur gear 111 on the rearward end thereof, which is selectively connectible with the forward end of the motor 13, so that it may be driven therefrom in reverse directions without reversal of said motor independently of movement of the other parts of the machine. A suitable slip clutch 113 of the pin type, loaded by means of a spring 114 in a usual manner is provided to connect the gear 109 with the shaft 110. Said clutch is of a construction well known to those skilled in the art and is arranged to slip upon a predetermined load on the shaft 110 to prevent breakage of the parts, and is not herein described in detail since it is no portion of my present invention.

Thus, a simplified arrangement of links and levers has been provided for equalizing loads between the forward and rearward ends of the support frame 19 and preventing binding between the guides 76, 76 and 77, 77 which mechanism also moves the cutter bar toward or from the turning frame 18 in parallel relation with respect thereto, and is confined substantially within the limits of the turning frame 18 when the parts are in a retracted position.

Referring now to Figure 3 in particular and the pivotal support for the cutter bar 16, which permits said bar to be swung at either a high positioning or low feeding speed about an axis disposed adjacent its rearward end and perpendicular to the axis of the turning frame 18, the cutter frame 20 is mounted in the support frame 19 on an annular shouldered bearing member 117. A ring gear 118 having an annular flange 119 extending inwardly therefrom is secured to the upper side of the cutter frame 20 by means of suitable cap screws extending through said annular flange and threaded within said cutter frame. Said annular flange extends over the bearing member 117 and said ring gear extends downwardly from the upper surface of said cutter frame in a pocket formed in said support frame.

The spur ring gear 118 is meshed with a spur pinion 120 journaled in the forward end of the support frame 19, which pinion is driven from a hub 124 of a worm gear 125, journaled in the turning frame 18 adjacent the forward end thereof, by means of an extensible drive connection which includes a splined shaft 121 engaging an internally splined hub of said spur pinion. Said splined shaft in turn slidably engages an internally splined sleeve 122 which is also externally splined and is slidably mounted within an internally splined portion of the hub 124 of the worm gear 125. Said worm gear is journaled on its hub in the turning frame 18 adjacent the forward end thereof in a suitable manner (see Figure 3). Suitable means are provided to limit downward movement of said splined shaft and splined sleeve with respect to each other when the turning frame 18 is in a normal or inverted position which means are not herein described, since they are no part of my present invention.

The worm gear 125 meshes with and is driven from a worm 130 on the forward end of a longitudinally extending shaft 132. Said worm and worm gear are of a usual self-locking type for holding said cutter bar in fixed relationship with respect to the support frame 19 when desired. The shaft 132 is journaled in the turning frame 18 and has a spur pinion 133 secured to its rearward end which may be selectively driven from the forward end of the motor 13 in reverse directions without reversal of said motor at either a high or low frictionally controlled speed in a manner which will hereinafter more clearly appear as this specification proceeds.

The drive connections from the forward end of the motor 13 for elevating said cutting element with respect to said truck, turning said turning frame about an axis extending longitudinally of the machine, moving the cutter bar toward or from said turning frame, and swinging the cutter bar at either a high positioning speed or low feeding speed include a transversely extending shaft 134 journaled in the frame 15 and driven from the motor 13 through reverse gearing which includes oppositely disposed bevel gears 135, 135 freely mounted on said shaft. Mechanisms driven from one end of said shaft serve to elevate the cutting element with respect to its supporting truck and selectively turn the turning frame 18, and mechanisms driven from the other end of said shaft serve to adjust the cutter bar with respect to the turning frame and swing the cutter bar about an axis perpendicular to the axis of said turning frame.

The bevel gears 135, 135 are meshed with a bevel gear 136 on the forward end of a longitudinal shaft 137. Said longitudinal shaft is journaled in the cutting mechanism support frame 15 and is driven from a spur gear 139 which is meshed with the motor pinion 33.

Suitable friction clutches 143, 143, of a usual construction and not herein shown or described in detail since they are no portion of my present invention, are provided for connecting either of the bevel gears 135, 135 with the shaft 134 for driving said shaft. Said clutches are engaged with their associated bevel gears by means of a clutch collar 144 which is shifted along said shaft by a clutch fork 145 engaging a clutch yoke 146. Said clutch fork is pivotally mounted on a bracket 147 secured to the turning frame 18 in a suitable manner (see Figure 12).

The clutch fork 145 is provided with an integrally formed lever 150 extending from the pivotal axis of said fork outwardly toward the side of the machine which, as herein shown, is its right hand side when looking toward the cutter bar (see Figure 12). A link 151 is pivotally connected to the outer end of the lever 150 and extends rearwardly along the upper side of the machine and is pivotally connected to one end of a rocking member 153. Said rocking member is mounted on the upperside of a cover 154 for the truck driving and feed gearing, for pivotal movement about a vertical axis disposed intermediate its ends. The other end of said rocking member has a rearwardly extending link 155 pivotally connected thereto, which is actuated by a hand lever 158 in an obvious manner. Said hand lever is mounted adjacent the rearward end of the machine for convenience in operation and is locked by means of a locking pin 159 in a usual manner.

The drive connection from the shaft 134 for either elevating the cutting element with respect to the truck frame or turning the turning frame about an axis extending longitudinally of the machine includes a spur gear 160 feathered on the shaft 134 and adapted to selectively engage either a spur gear 162 freely mounted on the transversely extending shaft 54 or a spur gear 65 keyed on the inner end of the transverse shaft 63.

The spur gear 160 is operatively connected with the shaft 54 for driving said shaft, by means of a suitable friction slip clutch 163 which is arranged to slip upon a predetermined load on said shaft (see Figure 4). Said slip clutch is of an ordinary construction well known to those skilled in the art and is no portion of my present invention, so will not herein be described in detail, and is loaded by means of a spring 164 encircling said shaft and interposed between a collar 165 threaded on said shaft and a drive member 167 feathered on said shaft (see Figure 5).

The spur gear 160 is shifted along the shaft 134 by means of a clutch fork 170 engaging a clutch yoke 171 mounted in the hub of said spur gear. Said clutch fork is movable in a horizontal plane and is provided with an inwardly extending lever arm 172 which has the forward end of a rearwardly extending link 173 pivotally connected thereto (see Figure 12). The rearward end of said link is pivotally connected to one end of a rocking member 174 similar to the rocking member 153. A link 175 is pivoted to the other end of said rocking member and extends rearwardly along the machine. Said last-mentioned link is actuated by a hand lever 177 mounted on the frame 14 at the rear end of the machine for pivotal movement about a vertical axis. A suitable locking pin 178 mounted in said hand lever is adapted to engage suitable apertures (not shown) for locking the spur gear 160 in engagement with either the spur gear 162 or the spur gear 65.

The end of the transversely extending shaft 134 opposite the spur gear 160 is provided with a worm 180 which forms a drive member for the mechanism for moving the cutter bar with respect to the turning frame 18 in a plurality of parallel planes and swinging the cutter bar at either a high positioning or low feeding speed. Said worm meshes with a worm gear 181 keyed on a longitudinally extending sleeve 182 journaled in the frame 15 (see Figure 6). Said sleeve extends within a planetary gear reduction mechanism 183, and as herein shown, has a pinion 184 cut integral therewith which serves as a sun gear for said planetary. Said sun gear meshes with and drives planetary pinions 185, 185 freely mounted on shafts 186, 186 mounted at their ends in a cage 187. Said planetary pinions mesh with an internal gear 188, herein shown as being formed integral with a spider 179 journaled on its hub within a support bracket 192. Planetary pinions 189, 189 are spaced from and are herein shown as being formed integral with the planetary pinions 185, 185. Said planetary pinions mesh with an internal gear 190 carried on a flanged spider 191 which is keyed on a longitudinally extending shaft 193.

A flange 194 of the cage 187 extends along the outer periphery of the internal gear 190. Said flange is adapted to be engaged by a friction band 195. The outer periphery of the internal gear 188 is likewise adapted to be engaged by a friction band 196. The friction bands 195 and 196 are engaged with or disengaged from the flange 194 and outer periphery of the internal gear 188, respectively, by means of a hand wheel 197 at the rearward end of the machine through a suitable system of shafts and gearing, which is no portion of my present invention, so will not herein be described in detail, which mechanism is so arranged that when one of said friction bands is in an engaged position, the other will be in a disengaged position and vice versa.

When the cage 187 is held from rotation by the friction band 195, the internal gear 190 will be driven through the sun gear 184, planetary pinions 185, 185, planetary pinions 189, 189 and internal gear 190, which will rotate the shaft 193 at a relatively high rate of speed. When the internal gear 188 is held from rotation by the friction band 196, and the cage 187 is free to rotate, the internal gear 190 will be driven through the sun gear 184 and planetary pinions 185 and 189 moving in an orbital path about the internal gear 188. This will drive the shaft 193 at a relatively low feeding speed.

A spur gear 199 is keyed on the outer end of the shaft 193 which meshes with and drives an idler gear 200. The faces of the teeth of said idler gear are relatively long and said idler gear is adapted to mesh with a spur gear 201 feathered on a sleeve 202 for movement therealong. Said sleeve is journaled on the longitudinally extending shaft 29 which is disposed coaxial with the turning axis of the turning frame 18. A spur gear 204 is keyed on the hub of the spur gear 201 and is adapted to mesh with either the spur pinion 111 for moving the cutter bar toward or from the turning frame 18 or the spur pinion 133 for swinging the cutter bar at either a frictionally controlled high positioning or low feeding speed (see Figure 4).

The spur gear 201 is shifted along the sleeve 202 by means of a system of links and levers which include a yoke 205 mounted in the hub of said spur gear in a usual manner. Said yoke is engaged by a clutch fork 206 mounted on a rock shaft 207 disposed above and extending transversely of the frame 15 (see Figure 12). A rocking arm 209 is mounted on the outer end of said shaft and is actuated by a suitable hand lever 210 at the rear end of the machine through a connecting link 211.

Referring now particularly to Figures 12 and 13 and the interlocking connection between the hand levers 177 and 158 and the means for locking the turning frame 18 from movement, which prevents engagement of the spur gear 160 with the spur gear 65 when the turning frame is in a locked position, said connection includes a member 212 mounted on the top of the cover 154 for slidable movement transversely thereof. Members 208, 208 project away from each other angularly upwardly from the outer end of the member 212 to form a V-shaped notch on the upper side of said member. Said notch is adapted to be engaged by a stop member 214 extending from and secured to the shaft 70 (see Figure 13). A bell crank 215 is pivotally mounted on the inner end of the member 212. One lever arm 216 of said bell crank extends toward and is slidably mounted in a transverse slot 217 formed on the upper surface of the link 175. Another lever arm 218 of said bell crank extends in a rearward direction and has a locking member 219 pivoted to its outer end. Said locking member is slidably mounted in the cover 154 in a guide 221 and has a notch formed on its outer end which is adapted to engage a projection 220 extending upwardly from the link 155.

The turning frame 18 is locked from turning movement when the stop 214 is in engagement with the notch formed by the members 208, 208, and the link 175 is locked from movement in a direction toward the forward end of the machine by engagement of the locking member 219 with the projection 220. This will prevent shifting of the gear 160 along the shaft 32 in a direction to engage the gear 65.

It should be noted, however, that the link 175 may be moved in a direction toward the rear end of the machine for engaging the spur gear 160 with the spur gear 162 for raising or lowering the cutting element with respect to its supporting truck, even though the link 175 is locked from movement in one direction. When said last-mentioned gears are in an engaged position the locking member 219 will be disengaged from the projection 220 which will permit shifting of the clutch collar 144 and permit the shaft 134 to be driven from either of the bevel gears 135, 135. The distance the link 155 moves when shifting the collar 144 to engage either of the clutches 143, 143 is so slight that the outer ends of the locking member 219 will engage the projection 220 which will prevent disengagement of the gear 160 from the gear 162, and movement of the link 175 in a direction to engage the gear 160 with the gear 65.

As the toothed segment 66 is disengaged from the teeth of the spur gear 59, the stop member 214 will engage the sides of the V-shaped notch formed by the members 208, 208 which will move the member 212 inwardly and pivot the bell crank member 215 in a direction to disengage the locking member 219 from the projection 220 and permit the gear 160 to be engaged with the gear 65 for turning the turning frame 18 to position the cutter bar for either top, bottom or shearing cutting.

It may be seen from the foregoing that an effective locking mechanism of a simple and novel construction has been provided which prevents attempted turning of the turning frame 18 when locked from turning movement, but which permits elevating or lowering of the cutting element with respect to its supporting truck for changing the cutting plane of the cutter bar, when said turning frame is so locked.

While I have herein shown and described one form in which my invention may be embodied, it will be understood that the construction and arrangement of the parts may be altered without departing from the spirit and scope of my invention. I do not, therefore, wish to be understood as limiting myself to the specific construction illustrated herein, excepting as specifically limited in the appended claims.

I claim as my invention:

1. In a mining machine, a truck, a cutting element mounted on said truck, said cutting element including a motor, a frame projecting forwardly therefrom, a turning frame projecting from said first-mentioned frame and mounted for pivotal movement with respect thereto about an axis extending longitudinally of the machine, a projecting chain carrying cutter bar mounted in said frame, means driven by said motor for turning said turning frame including selectively operable reverse gearing and a selective drive connection therefrom including a clutch, means for locking said turning frame in fixed relation with respect to said first-mentioned frame including a pivotally movable member, and interlocking means between said turning means and locking means to prevent the attempted turning of said turning frame in either direction while said frames are locked in fixed relation with respect to each other including another member adapted to be engaged and moved by said pivotally movable member upon pivotal movement thereof, and a linkage connection between said last named member and turning means to prevent engagement of said clutch when said frames are locked with respect to each other.

2. In a mining machine, a truck, a cutting element mounted on said truck, said cutting element including a motor, a frame projecting forwardly therefrom, a turning frame projecting from said first-mentioned frame and mounted for pivotal movement with respect thereto about an axis extending longitudinally of the machine, a projecting chain carrying cutter bar supported by said frame, a selective drive connection from said motor for turning said turning frame including a shaft and means for selectively connecting said turning frame with said shaft including a link, means for locking said turning frame from movement, means for operating said locking means including a pivotally movable lever, and an interlocking connection between said lever and link to prevent movement of said link in a direction to operatively connect said turning frame with said shaft when said locking means is in a locked position.

3. In a mining machine, a truck, a cutting element mounted on said truck, said cutting element including a motor, a frame projecting forwardly therefrom, a turning frame projecting from said first-mentioned frame and mounted for pivotal movement with respect thereto about an axis extending longitudinally of the machine, a projecting chain carrying cutter bar supported by said frame, a selective drive connection from said motor for turning said turning frame including a shaft, and means for selectively connecting said turning frame with said shaft including a control link movable rectilinearly along the machine, means for locking said turning frame from movement, means for operating said locking means including a pivotally movable lever, and an interlocking connection between said lever and link to prevent movement of said link in a direction to operatively connect said turning frame with said shaft when said locking means is in a locked position comprising a link movable transversely of said first-mentioned link, means on said lever engaging said transversely movable link to prevent movement thereof when said locking means is in a locked position, and a locking connection from said transversely movable link to said first-mentioned movable link.

4. In a mining machine, a truck, a cutting element mounted on said truck, said cutting element including a motor, a frame projecting forwardly therefrom, a turning frame projecting from said first-mentioned frame and mounted for pivotal movement with respect thereto about an axis extending longitudinally of the machine, a frame mounted for movement towards and from said turning frame, a projecting chain carrying cutter bar supported by said frame, a selective drive connection from said motor for turning said turning frame including a shaft, reverse gearing interposed between said motor and shaft for driving said shaft including a clutch member, means for selectively connecting said shaft with said turning frame, for turning said turning frame including a hand lever and a link pivotally connected thereto and movable rectilinearly along the machine, another hand lever and link parallel to said first-mentioned link for operating said clutch and selectively engaging said shaft with said reverse gearing, means for locking said turning frame from turning movement, means for operating said locking means including a lever and a pivotally movable rod operated thereby, and an interlocking connection between said rod and links to prevent turning movement of said turning frame when said locking means is in an engaged position comprising a link movable transversely of said other links and held from movement in certain positions of said rod, and a locking connection between said last-mentioned link and said levers.

5. In a mining machine, a base, a cutting element mounted on said base, said cutting element including a frame, a turning frame projecting therefrom and mounted for pivotal movement with respect thereto about an axis extending longitudinally of the machine, a cutter bar projecting from said frame and having a cutter chain movable thereabout, selectively operable reverse gearing for turning said turning frame, and means for selectively connecting said reverse gearing in operative relation with said turning frame including a clutch and a linkage connection for operating said clutch, means for locking said turning frame in fixed relation with respect to said first-mentioned frame including a pivotally movable member, and an interlocking connection between said member and linkage connection to prevent the attempted turning of said turning frame in either direction while said frames are locked in fixed relation with respect to each other including a member engaged by said pivotally movable member and moved thereby upon pivotal movement thereof, and a connection between said member and linkage connection to hold said linkage connection from movement and prevent engagement of said clutch when said locking means is in an engaged position.

6. In a mining machine, a base, a cutting element mounted on said base, said cutting element including a frame, a turning frame projecting therefrom and mounted for pivotal movement with respect thereto about an axis extending longitudinally of the machine, a cutter bar projecting from said frame and having a cutter chain movable thereabout, selectively operable reverse gearing, and means for selectively connecting said reverse gearing with said turning frame for turning said turning frame including a clutch and a linkage connection for operating said clutch including a translationally movable link, means for locking said turning frame in fixed relation with respect to said first-mentioned frame including a pivotally movable member, and an interlocking connection between said pivotally movable member and link to prevent the attempted turning of said turning frame in either direction while said frames are locked in fixed relation with respect to each other including a member movable transversely of the axis of said pivotally movable member, a connection between said members for holding said transversely movable member from movement when said frames are in a locked position and for transversely moving said member by movement of said pivotally movable member when said locking means is being moved to an unlocked position, and a locking connection between said transversely movable member and link to hold said link from movement and prevent engagement of said clutch when said locking means is in an engaged position.

7. In a mining machine, a support frame, a cutting element mounted on said support frame for vertical movement with respect thereto and including a motor having a turning frame projecting therefrom and mounted for pivotal movement about an axis extending longitudinally of the machine, a cutter bar having a cutter chain movable thereabout projecting from said turning frame, a selective drive connection from said motor for turning said turning frame, another selective drive connection from said motor for elevating said cutting element with respect to said support frame, means for locking said turning frame in fixed relation with respect to said motor, means for operatively connecting said motor with the means for turning said turning frame or the means for elevating said cutting element including a hand lever and a link rectilinearly movable with respect to the machine, means for operating said locking means including a hand lever and a pivotally movable rod, and an interlocking connection between said rod and link to permit said link to be moved in a direction to operatively connect said motor with said adjusting mechanism, but prevent said link from being moved in a direction to connect said motor with said turning mechanism when said locking means is in a locked position.

8. In a mining machine, a support frame, a cutting element mounted on said support frame for vertical movement with respect thereto and including a motor having a turning frame projecting therefrom and mounted for pivotal movement about an axis extending longitudinally of the machine, a cutter bar having a cutter chain movable thereabout projecting from said turning frame, a selective drive connection from said motor for turning said turning frame, another selective drive connection from said motor for elevating said cutting element with respect to said support frame, said drive connections including reverse gearing, means for locking said turning frame in fixed relation with respect to said motor, means for operatively connecting said motor with the means for turning said turning frame or the means for elevating said cutting element including a hand lever and a link rectilinearly movable with respect to the machine, means for controlling operation of said reverse gearing including a hand lever and a rectilinearly movable link parallel to said first-mentioned link, means for operating said locking means including a hand lever and a pivotally movable rod extending longitudinally of the machine, and an interlocking connection between said rod and links to permit said cutting element to be elevated or lowered with respect to said supporting frame, but to prevent the attempted turning of said turning frame when locked by said locking means, comprising a stop on said rod, a link movable transversely of said first-mentioned links and adapted to engage said stop, a connection from the latter link to said first-mentioned link, and another connection between said last-mentioned link and said second-mentioned link whereby said first-mentioned link may be moved in a direction to operate said elevating means but may be locked from movement in a direction to operate said turning means, and whereby said second-mentioned link may be moved to operate said reverse gearing upon movement of said first-mentioned link in a direction to operate said elevating means.

9. In a mining machine, a support frame, a cutting element mounted on said support frame for vertical movement with respect thereto and including a motor having a turning frame projecting therefrom and mounted for pivotal movement about an axis extending longitudinally of the machine, a cutter bar having a cutter chain movable thereabout projecting from said turning frame, a selective drive connection from said motor for turning said turning frame, another selective drive connection from said motor for elevating said cutting element with respect to said support frame, said drive connections including reverse gearing, means for locking said turning frame in fixed relation with respect to said motor, means for operatively connecting said motor with the means for turning said turning frame or the means for elevating said cutting element including a hand lever and a link rectilinearly movable with respect to the machine, means for controlling operation of said reverse gearing including a hand lever and a rectilinearly movable link parallel to said first-mentioned link, means for operating said locking means including a hand lever and a pivotally movable rod extending longitudinally of the machine, and an interlocking connection between said rod and links to permit said cutting element to be elevated or lowered with respect to said supporting frame, but to prevent the attempted turning of said turning frame when locked by said locking means, comprising a stop on said rod, a link movable transversely of said first-mentioned links, a bell crank pivotally connected to said link, a slidable connection from one lever arm of said bell crank member to said first-mentioned link and a locking connection between the other lever arm of said bell crank and said second link, whereby said first-mentioned link may be moved in one direction only and said second link may only be moved upon movement of said first link in its permitted direction of movement.

10. In a mining machine, a support frame, a cutting element mounted on said support frame for vertical movement with respect thereto and including a motor having a turning frame projecting therefrom and mounted for pivotal movement about an axis extending longitudinally of the machine, a cutter bar having a cutter chain movable thereabout projecting from said turning frame, a selective drive connection from said motor for turning said turning frame, another selective drive connection from said motor for elevating said cutting element with respect to said support frame, said drive connections including reverse gearing, means for locking said turning frame in fixed relation with respect to said motor, means for operatively connecting said motor with the means for turning said turning frame or the means for elevating said cutting element including a hand lever and a link rectilinearly movable with respect to the machine, means for controlling operation of said reverse gearing including a hand lever and a rectilinearly movable link parallel to said first-mentioned link, means for operating said locking means including a hand lever and a pivotally movable rod extending longitudinally of the machine, and an interlocking connection between said rod and links to permit said cutting element to be elevated or lowered with respect to said supporting frame, but to prevent the attempted turning of said turning frame when locked by said locking means, comprising a stop on said rod, a link movable transversely of said first-mentioned links, a bell crank pivotally connected to said link, a slidable connection from one lever arm of said bell crank member to said first-mentioned link and a locking connection between the other lever arm of said bell crank and said second link, whereby said first-mentioned link may be moved in one direction only and said second link may only be moved upon movement of said first link in its permitted direction of movement comprising a link pivoted to the other lever arm of said bell crank for movement transversely of said first and second links and a locking connection from said last-mentioned link to said second-mentioned link.

WILLIAM W. SLOANE.